Dec. 12, 1944.  W. P. STUCKERT ET AL  2,364,673
GLASS FORMING APPARATUS
Filed March 15, 1941   4 Sheets-Sheet 1

William P. Stuckert, INVENTORS
Harold H. Snyder,
BY
ATTORNEY.

Dec. 12, 1944.    W. P. STUCKERT ET AL    2,364,673
GLASS FORMING APPARATUS
Filed March 15, 1941    4 Sheets-Sheet 2
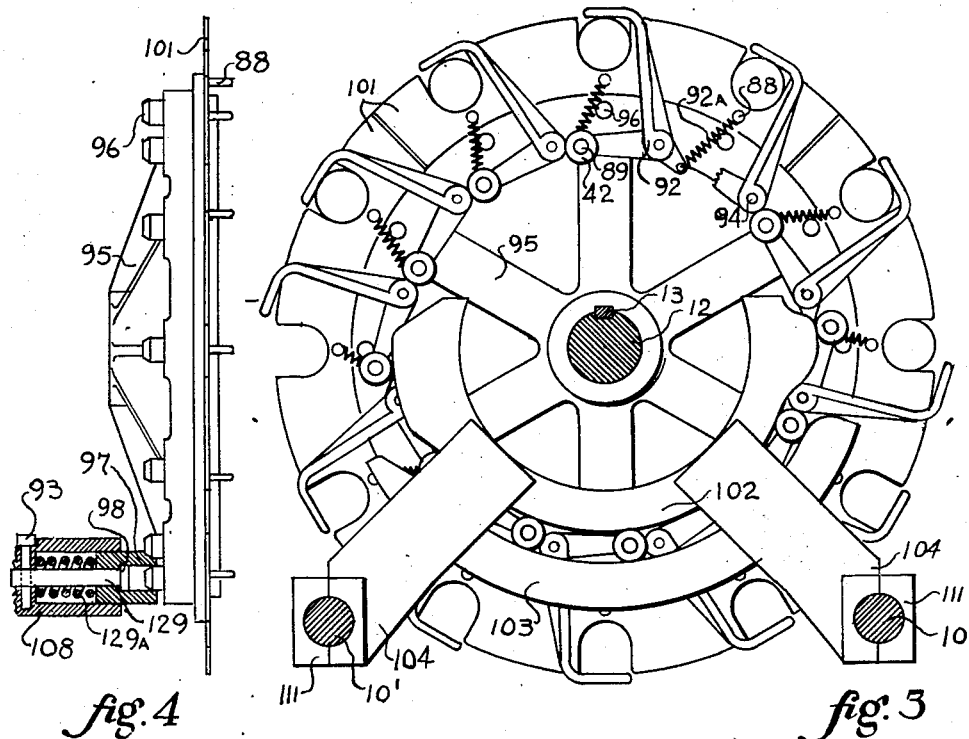
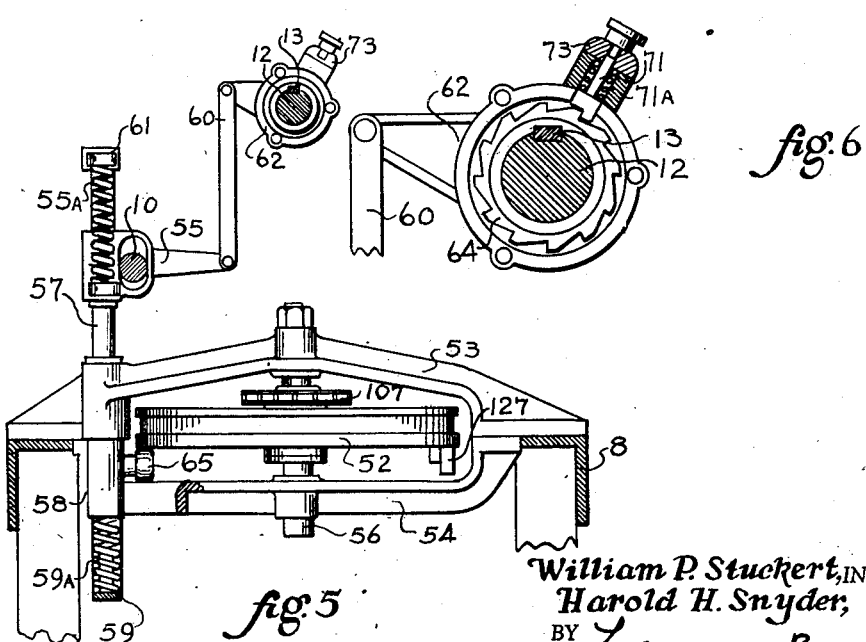
William P. Stuckert, INVENTORS
Harold H. Snyder,
BY Lawrence Burns
ATTORNEY

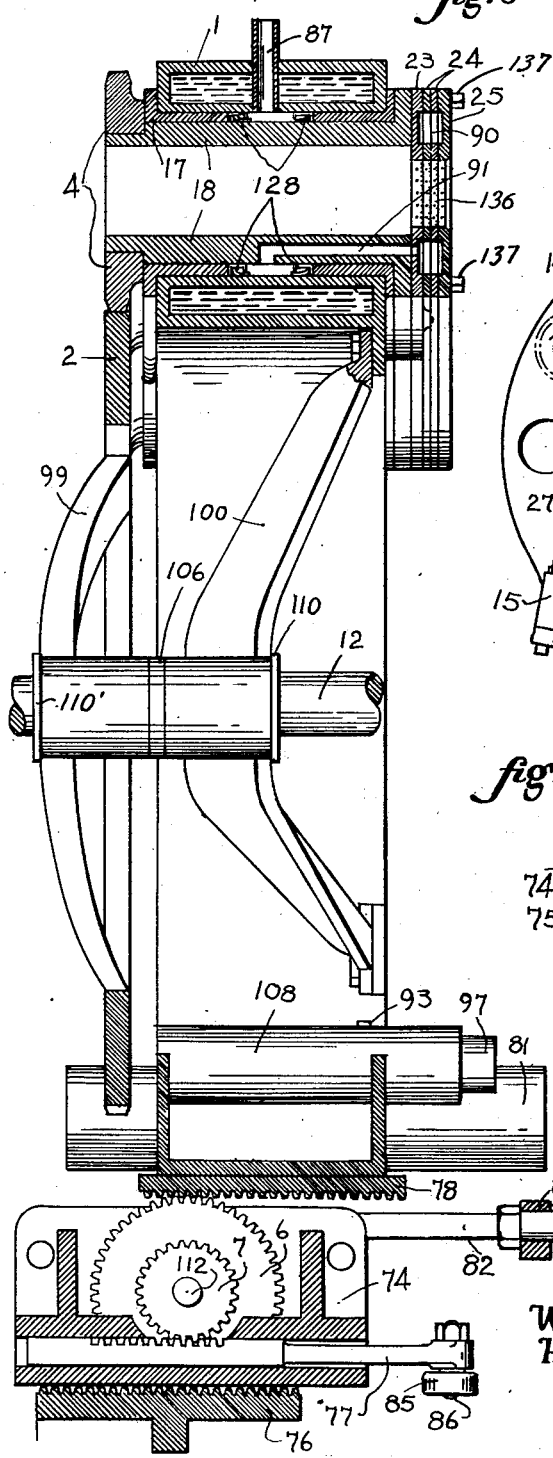
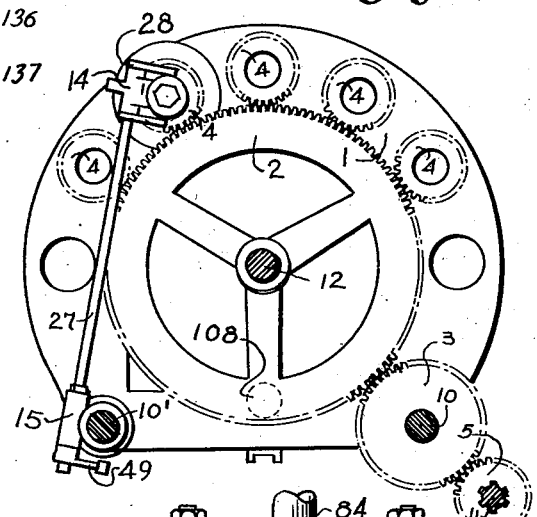
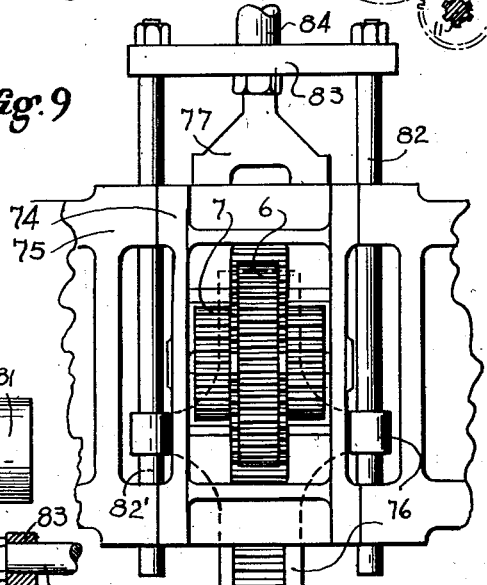

Dec. 12, 1944.  W. P. STUCKERT ET AL  2,364,673
GLASS FORMING APPARATUS
Filed March 15, 1941  4 Sheets-Sheet 4
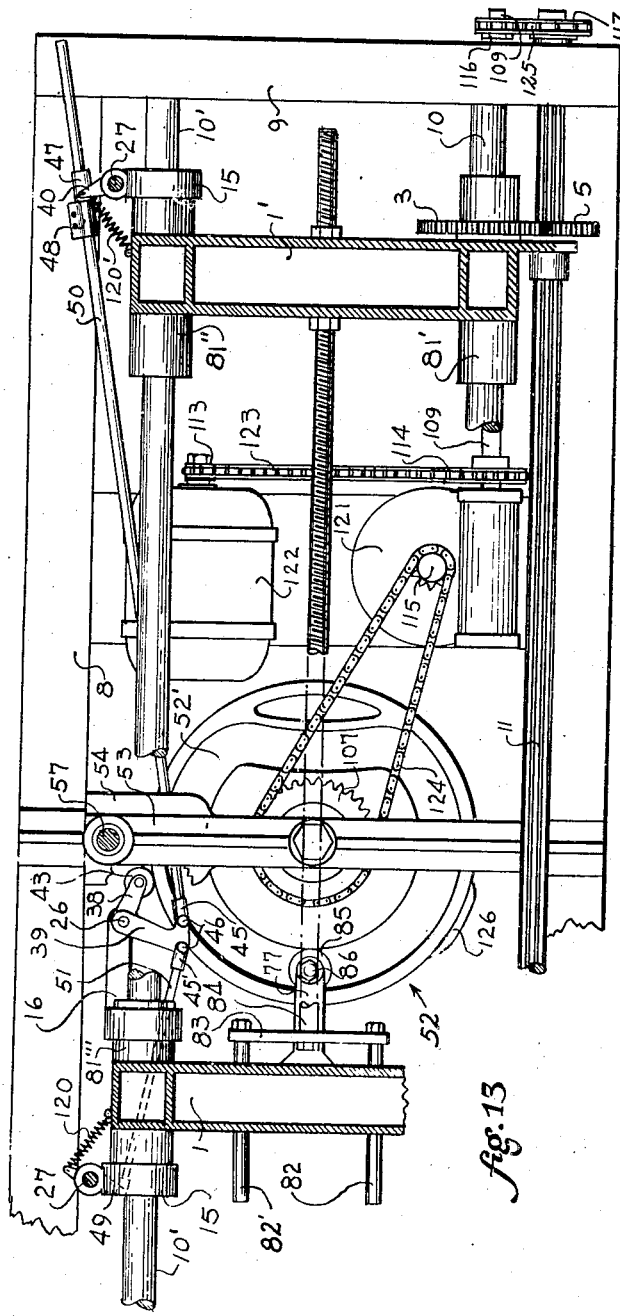
William P. Stuckert,
Harold H. Snyder, INVENTORS
BY Lawrence Burns,
ATTORNEY Patented Dec. 12, 1944

2,364,673

UNITED STATES PATENT OFFICE 2,364,673

GLASS FORMING APPARATUS

William P. Stuckert, Marblehead, and Harold H. Snyder, Lynn, Mass., assignors to Sylvania Electric Products Inc., a corporation of Massachusetts Application March 15, 1941, Serial No. 383,586

7 Claims. (Cl. 49—7)

This invention relates to glass machinery.

An object of this invention is to provide a machine for forming a neck on the ends of a tubular glass envelope.

Another object is to provide a necking machine which will enable the proper necking to be accomplished even when the bulbs are not cylindrically perfect or are not perfectly straight.

A further object is to provide a necking machine in which the bulb being necked is held in a manner to prevent longitudinal motion thereof thus insuring uniformity of dimensions of both the lips and the shoulders of each neck formed.

Further objects, advantages and features will be apparent from the following specification taken in conjunction with the accompanying drawings in which:

Figure 3 is an elevation of one of the conveyor wheels, showing the manner in which the bulbs are held in position.

Figure 4 is a partly sectional side view of one of the conveyor wheels showing the manner in which the centering pin operates.

Figure 5 is an elevation partly in section of the conveyor indexing mechanism.

Figure 6 is a detail in section of the indexing ratchet assembly.

Figure 7 is an elevation of the operating frame assembly.

Figure 8 is a partly sectional side elevational view of the operating frame assembly and its actuating means.

Figure 9 is a plan of the mechanism for operating the frame.

Figure 10 is a detail in section of the bulb necking mechanism taken adjacent one of the conveyor wheels.

Figure 11 is an elevation showing the relative location of the internal forming plug and the neck-forming rollers in their non-operating position.

Figure 12 is an elevation showing the relative location of the internal forming plug and the neck forming rollers in the neck forming position.

Figure 13 is a partially sectional plan view of the operating cam and drive mechanism.

Figure 1:
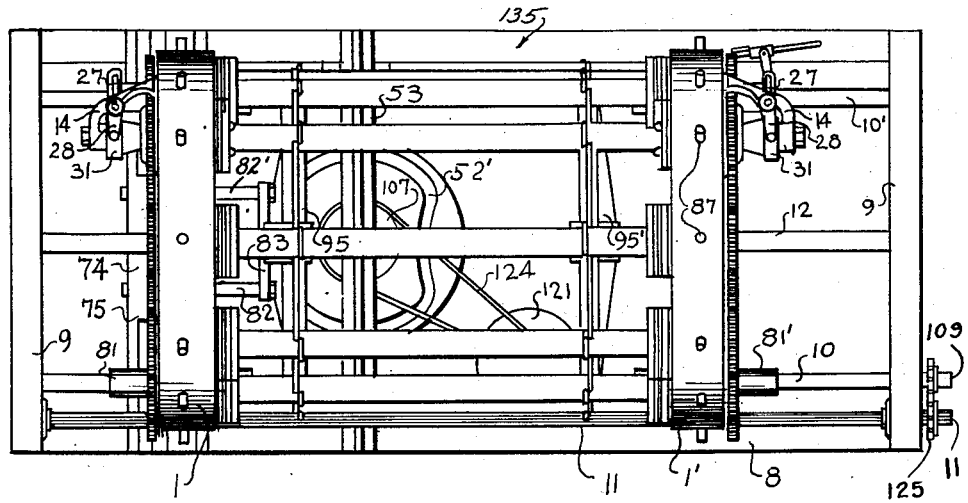
Figure 1 is a top view of the bulb neck-forming machine.

For the most part, machines built to shape the end or ends of a glass envelope have been based on the principle of rotating the glass envelope and keeping the neck forming mechanism stationary. However, there are certain inherent disadvantages in that type of machine. The machine of this invention is based on the principle of keeping the bulb stationary and the burners and neck-forming mechanism rotating. By adopting this principle and by using the means herein described and illustrated, the disadvantages present in the former type of machine first mentioned are eliminated.

If a bulb is not perfectly cylindrical or if it is not perfectly straight, its rotation merely serves to make the defect more pronounced. When a bulb, defective in one or both of these respects, is necked on a machine in which the bulb is rotated and the burners and neck-forming mechanism is stationary, the shoulder of the neck will not be uniform because of the pitch developed by the rotation of the bulb.

Another disadvantage obviated by the machine herein described, is the tendency of a bulb to move longitudinally while it is being rotated. The fact that the bulb must be free to rotate necessarily presents an opportunity for longitudinal motion thereof. Any motion of this nature will result in a lack of uniformity of size in the depth of the lip being formed on the ends of the glass bulb. The lips should be of the same depth on both ends of the bulb. A shifting of the bulb to the right or to the left will result in an increase in the depth of the lip on the end towards which the shift has occurred and a corresponding decrease in the depth of the lip on the other end.

We have therefore devised a bulb necking machine in which the bulbs are held fixed on an indexing conveyor. As the bulbs are carried through several indexing steps, the rotating burners and the rotating neck forming device are caused to move in and encircle the ends of the stationary bulbs. The number of burners used to heat the ends of the glass envelope to a point where the glass is sufficiently pliable to have the ends formed may vary according to the size and wall thickness of the glass envelope. However, we have found that for our purposes two preheating burners and a final heating burner before the neck forming are sufficient. Our machine is so constructed that more burners may very readily be added without departing from the spirit of the invention.

Another distinct advantage to be gained by having the burners move in and encircle the ends of the bulb instead of having the flames from the burners play on the bulb from an angle at a point beyond the ends thereof, is that slight cracks in the ends of the bulb will not be enlarged and chased up the length of the bulb but will be seared and the glass fused so that the crack will disappear.

Another feature of our machine is its guarantee of accurately centered necks. It is absolutely necessary to have all radii extending out to the lip being formed by the necking device to be of the same length. If these radii vary in length, the neck being formed will be off center. Control over this problem never could be exercised when the method of rotating the bulbs was used because if the bulb were not perfectly straight or cylindrically perfect the center of the bulb would be in an ever changing position during the rotation period.

We have devised a centering stud which automatically centers the bulb with respect to the neck forming device. It acts as a check to guarantee that the bulb has been moved to exactly the right position to have the neck-forming device move in and form the neck.

Another problem which the old type of necking machine does not solve is that presented when the wall thickness of the bulb at its end is irregular. The necking device used on the machines which utilized the rotating bulb principle, of necessity, possessed a certain degree of flexibility. It had to, to accommodate bulbs which "pitched" because of lack of cylindrical perfection and bulbs which were not perfectly straight. However, in our machine, the necking mechanism possesses a rigidity capable of insuring even wall thickness of the lip of the neck.

When our rotating necking mechanism moves in on the bulb, the rotating internal forming tool will occupy substantially all of the internal area at the end of the bulb. The outside rollers which aid in forming the lip move in, in unison, a predetermined distance so that when their inward motion has been completed, the distance between the rollers and the internal forming tool represents the wall thickness of the lip of the neck to be formed. If the wall thickness of the end of the bulb varies, the neck forming mechanism pushes along the excess molten glass, where ever it might be located, and deposits it at such points along the rim of the bulb which are too thin. If there is still an excess of molten glass over that necessary to give the desired wall thickness to the lip, such excess, following the path of least resistance, will be squeezed out the end to add slightly to the depth of the lip.

Figure 2:
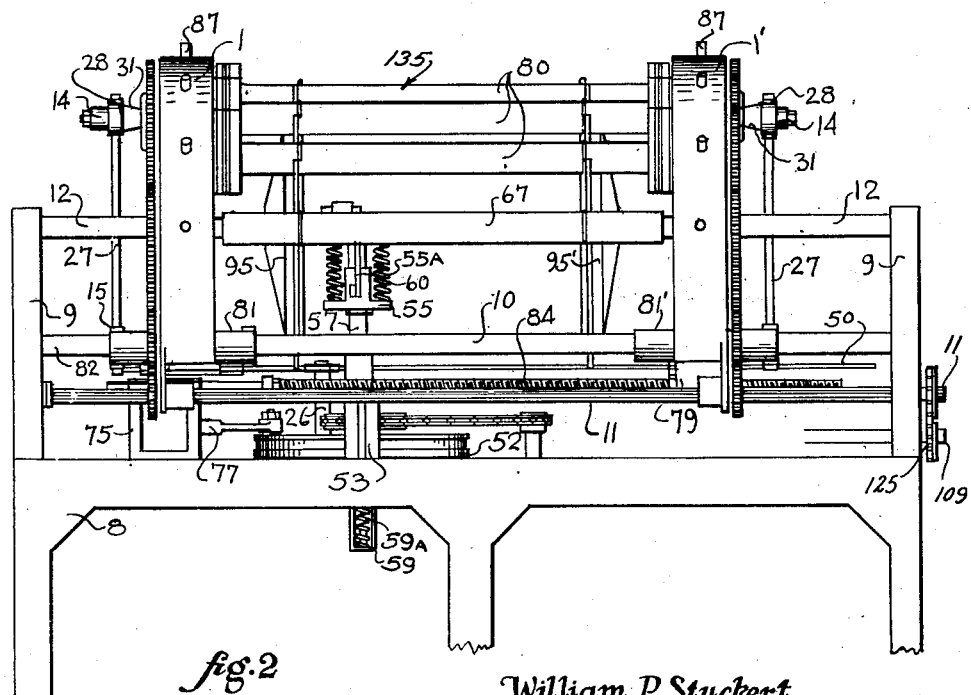
Figure 2 is a side elevational view of the bulb neck-forming machine.

Parts of the drive arrangement are omitted in Figures 1 and 2 to avoid confusion, but are properly shown in Figure 13. As in Figure 2 the machine is mounted on the structural base 8 and within the end frames 9. The two water-cooled jackets 1 and 1' carry the rotating burners and the necking device. These water-cooled jackets 1 and 1' are adjustably mounted on the two water jacket slide shafts 10 and 10' through the sleeves 81, 81', 81'', and 81'''. Rotation is conveyed to the burners and the necking device through a ring gear 2 which is meshed with the burner and necking gears 4. This ring gear is driven through another ring gear 3 meshed with the driven pinion 5 on the burner drive splined shaft 11. Gears 2, 3, and 5, are free to rotate, but are secured to the water jackets 1 and 1' so as to move in and out therewith. Due to the nature of the view in this figure the exact relationship of these gears to each other cannot be clearly shown. However, this is adequately brought out in Figure 7. The shaft 11 is driven by the drive shaft 109 through the reducer burner chain 125 and the burner drive sprocket 116.

Bulbs to be necked are firmly fixed in a conveyor assembly 135 comprising a pair of conveyor wheels fixed to the indexing shaft 12. The conveyor wheels comprise a pair of supporting flanges 95 and 95' shown in Figure 2 keyed to the shaft 12 through the key 13 with a series of tube ring plates 101 mounted about the outer rims of flanges 95 and 95' and constitute the frame about which the various parts which go to make up the bulb necking machine are mounted. The structure of these conveyor wheels is shown more in detail in Figure 3. Figure 2 shows a bulb 67 in position on the conveyor just after it has been placed thereon and before it has reached one of the heating positions. The bulbs 80 are shown in the more advanced positions with the ends thereof encircled by the rotating burners projecting from the water jackets 1 and 1'.

The necking mechanism used to form the necks on the ends of the bulbs is operated through the necking lever shaft 27. The top of this shaft 27, as shown in Figure 2, is connected to the sliding sleeve 31 through the sliding sleeve lever 28. The lower end of the necking lever shaft 27 is supported through the necking lever shaft support 15 which is in turn clamped to one of the sleeves 81 through which the water jacket slide shafts 10 and 10' pass. The necking rod lever 49 is attached to the bottom of the necking lever shaft 27. This lever, and the mechanism with which it is connected are shown more clearly in Figure 13.

This machine has a means for necking the bulbs, a means for indexing the conveyor wheels carrying the bulbs, and a means for causing the water jackets 1 and 1' to move in and out to have the burners mounted thereon encircle the ends of the bulbs. These three distinct operating motions are accomplished through the operating cam wheel 52. This cam wheel is driven through the cam reducer chain 124 and the reducer drive sprocket 115.

The movement of the water jackets 1 and 1' in and out to alternately enclose the ends of the bulbs and then withdraw to permit the indexing of the conveyor wheels carrying the bulbs is accomplished through the operating slide 77. The water jacket connecting shaft 84 provides the means through which both water jackets 1 and 1' may be actuated through the operating slide 77 rather than only the one with which it is more immediately associated. This connecting shaft 84 is threaded for its entire length and passes through the water jacket block 79 located on the lower extremity of the further water jacket 1'. The manner in which this shaft 84 operates and is connected to the operating slide 77 is brought out more in detail in Figure 9. The operating slide 77 operates within a frame 74 which is fixed in the water jacket slide bracket 75 which in turn is secured upon the frame 8.

The necking mechanism is actuated through the necking lever shaft 27 and the cam lever shaft 26.

The indexing of the conveyor wheels is accomplished through the indexing shaft 57. The manner in which this is accomplished is shown more in detail in Figures 5 and 6. The indexing arm 55 is resiliently attached to the top of the indexing shaft 57 indirectly through springs 55a and bar 61. Bar 61 is connected rigidly and directly to the top of indexing shaft 57. The indexing link 60 connects the indexing arm 55 with the indexing ratchet housing 62.

The gas supply ports 87 in the water jackets 1 and 1' may be connected through some resilient or flexible connecting lines to a gas supply.

Figure 1 shows a little more in detail just where the water jacket connecting shaft assembly is located with respect to the rest of the machine by showing slide bracket shafts 82 and 82'. This shaft 84 is not seen but is located directly beneath the indexing shaft 12 in this figure. The bar 83 joins the water jacket connecting shaft to the two slide bracket shafts 82 and 82'. As in Figure 9, it is to these slide bracket shafts that the water jacket bracket 76 is fixed.

A series of lock levers 92 are attached to the supporting flange 95 through the lock lever pins 94. These lock levers serve to hold the bulbs tightly in the cut-outs provided therefor in the tube ring plates 101. They are caused to open and close, to admit a bulb and then hold it tightly, through a series of springs and cam rollers acting on a cam 102.

The lock lever springs 92a have one end fixed to studs 88 projecting through the tube ring plates 101 from the supporting flange 95 and the other end fixed to the lock levers 92. Tension is on these springs when the lock levers 92 are in their locking positions. When the supporting flange indexes around, the lock lever cam rollers 42, held through the lock lever cam roller pins 89 at the end of the lock levers 92 opposite the end to which the lock lever springs 92a are connected, will encounter the lock lever cam 102. This will cause the lock lever 92 to move back pivoting about the lock lever pin 94 and thus release the bulb held within the cut-out on the tube ring plate 101. As the supporting flange 95 indexes around further, the lock lever cam roller will pass through the channel provided therefor by the lock lever cam 102 and the lock lever rail 103, supported from the lock lever rail bracket 104 which is in turn mounted on the water jacket slide shafts 10 and 10' through the lock lever rail caps 111.

Since tension on the lock lever springs 92a is increased by the lever moving back to release the bulb the lever will be drawn back to its locking position as soon as the contour of the cam 102 so permits. When the supporting flange 95 has indexed around to a point where a bulb is to be received within the cut-outs in the plate 101, the contour of the cam 102 is such that the lever 92 moves back for the admission of the bulb and then moves forward again to hold the bulb firmly in place.

Figure 4 shows how the centering device operates with respect to the conveyor wheel. The centering pins 96 project from the supporting flange 95 at a point radially in line with the center of the cut-outs as on a radius of the flange 95. The inner ends of these pins 96 and their position in relation to the cut-outs on the tube ring plates 101 are shown in Figure 3. The centering plug assembly is located in the centering sleeve 108 which is in turn located in the lower extremity of the water cooled jacket 1 as shown in Figure 8. The centering plug 97 is centered in the base of the sleeve 108 and is fitted around the outer end of the centering plug pin 129. The inner end of this pin 129 is held in position in the centering sleeve 108 through the pin 93. The centering plug 97 is projected out from the centering sleeve 108 by the centering plug pin spring 129a. The distance it can be projected out from the sleeve by this spring is limited by the collar 98 on the forward extremity of the centering plug pin 129 on which it slides.

In operation, the centering plug 97 moves in to properly center the conveyor wheels with respect to the burners and the necking mechanism. Since the centering mechanism is located in the sleeve 108, which is in turn located in the lower extremity of the water cooled jacket 1 it moves out to permit the indexing of the conveyor wheels and then moves in when the indexing has been completed. There is always tension on the spring 129a. When the water jacket 1 has completed its inward movement, the centering plug 97 will have encircled the centering pin 96 on the conveyor wheel if the indexing has properly aligned these wheels with the burners and the necking mechanism. If they are not accurately aligned, the centering plug will not have encircled the centering pin but will have struck it at a point off its center. The end of the centering pin 96 is sufficiently beveled to accomplish the proper centering in conjunction with the pressure exerted against the centering plug 97 by the contracted centering plug pin spring 129a. Thus the conveyor wheel will be adjusted to produce the accurate centering desired.

As in Figure 5, the operating cam wheel 52 is mounted on the cam shaft 56 and is supported by the upper support 53 and the lower support 54. These supports are in turn mounted on the structural base 8. The indexing cam 127 is mounted on the bottom of the cam wheel 52. The lower support 54 is hollowed out to provide room for the indexing cam roller 65 when it is contacted by the indexing cam 127 as the cam 52 operates.

The indexing roller 65 is attached to the indexing shaft 57 through the indexing roller block 58. The indexing arm 55, through which the water jacket slide shaft 10 extends, is attached to the indexing shaft 57. The indexing shaft bar 61 is mounted on top of the indexing shaft 57. When the indexing cam 127 strikes the indexing roller 65 it pushes the roller downward. This pulls the shaft 57 downward. The indexing arm 55 and the indexing link 60 attached thereto will also be drawn downward. This downward motion of the indexing link 60 will be transmitted into the counter-clockwise motion of the indexing ratchet housing 62. This will result in the counter-clockwise movement of the indexing ratchet wheel 64 and the indexing shaft 12 to which it is keyed through the key 13 as more clearly shown in Figure 6.

As shown in Figure 6, the clockwise movement of the housing 62 will push the ratchet pin 71 upward thus causing contraction of the ratchet pin spring 71a which is capped by the indexing ratchet pin cap 73. The spring 71a contracted by the upward movement of the ratchet pin 71 will expend the pressure built up thereby, by pushing the pin 71 back down to lock the ratchet wheel in place after the wheel has indexed one position. This is not inconsistent with the operation of centering plug 97 since the shaft 12 may be rotated slightly by the action of plug 97 against spring 71 in one direction, and against springs 55a in the other direction.

As shown in Figure 5, the indexing spring stirrup 59 extending below the indexing cam roller block 58, carries the spring 59a which is contracted by the downward stroke of the indexing shaft 57 and which expends the pressure built up thereby to push the shaft 57 back up so that the cam roller 65 will be in firm contact with the bottom of the operating cam wheel 52 after the indexing cam 127 has passed by.

The indexing arm springs 55a shown in Figure 2 as well as in Figure 5 serve as a safety device to prevent any excessive strains being placed on the machine as a result of the failure of the ratchet wheel 64 and its associated parts to function properly. If for any reason the indexing arm 55 should fail to move downward with the downward stroke of the indexing shaft 57, the indexing arm springs 55a, which are suspended between the indexing shaft bar 61 and the indexing arm 55, will contract and thus serve as a harmless outlet for the downward stroke of the indexing shaft 57, since arm 55 is suspended by springs 55a and has no rigid connection with shaft 57.

Figure 7 shows the manner in which the mechanism for operating the burners and the necking device within the water jackets 1 and 1' is arranged. The necking lever shaft 27 is loosely fitted through the necking shaft support 15 which is attached to the water jacket slide shaft 10'. The necking ring bracket 14 and the sliding sleeve lever 28 are located at the top of the necking lever shaft 27. The sliding sleeve lever 28 transmits to the necking device the motion transmitted to it through the necking lever shaft 27 from the necking rod lever 49.

The water jackets 1 and 1' are mounted on the water jacket slide shafts 10 through the water jacket frame sleeves 81. The indexing shaft 12 which extends through the ring gear 2 is bushed thereto through the ring gear bushing 106 and the ring gear bushing flanges 110 and 110'. The ring gear spider 99 serves as a support for the ring gear 2 and movement of the ring gear support 100 serves to move the ring gear 2 with the water jacket 1 because of the joining arrangement of the flanges 110 and 110'.

Each rotating burner used on this machine consists of a group of four annular ring plates with burner holes 136 on their inner periphery, an inner ring plate 23, two intermediate ring plates 24 and an outer ring plate 25 joined by bolts 137 or other suitable means. However, more of these ring plates may be very readily added without departing from the spirit of this invention, for the ready adjustability of these ring plates which go to make up these burners is one of the features of this invention. For example more plates may be desirable when the wall thickness of the glass envelope being necked is greater. The gas enters the gas supply ports 87 and passes through the gas channel 91 into the gas chamber 90 formed by the recesses in the laminated plates 23, 24 and 25. The burner sleeve seals 128 seal the gas line from the burner sleeve 18, and the burner sleeve bushing 17. The burner sleeve 18, on the front of which the laminated plates 23, 24 and 25 are mounted, has the burner gear 4 on the rearward end thereof.

The in and out cam action is transmitted to one of the water jackets through the water jacket operating rack 78 attached to the bottom thereof, and to the other water jacket through the water jacket connecting shaft 84.

The water jacket slide roller 85 is held by the water jacket slide roller pin 86 to the water jacket slide 77. This roller is in contact with the operating cam 52' through which this in and out motion of the water jackets is obtained. The relationship of the roller 85 to the cam 52' is brought out more in detail in Figure 13. A portion of the top of this slide 77 is meshed with the slide pinion 7. This slide pinion 7 and the slide gear 6 are both held on the water jacket operating gear pin 112 so that the movement of the pinion 7 caused by the motion of the slide 77 will be transmitted to the slide gear 6. This slide gear 6 is meshed to the water jacket operating rack 78 located on the bottom of the water jacket 1. Thus in this manner the movement of the water jacket slide 77 is transmitted to the water jacket 1 adjacent thereto.

Figure 10 shows in detail the structure of the necking mechanism. The movement of shaft 27 is transmitted to the sliding sleeve 31 through the sliding sleeve lever 28. The sliding sleeve 31 is loosely fitted about the necking plug shaft 30 which is held in place by the necking ring bracket 14. The in and out movement of the sliding sleeve 31 is transmitted to the necking levers 22 through the necking lever rollers 36 on the ends of the necking levers 22. The necking levers 22 are pivotally fitted in the necking lever plate 21 to hold them in their proper position within the necking sleeve 19. The necking sleeve 19 is bushed to the water jacket 1 through the necking sleeve bushing 118. When the sliding sleeve 31 is caused to move inward by the movement of the necking lever shaft 27, the forward extension of the necking levers 22, whose rearward extension pivot on the necking lever plate 21, will draw the necking slide 33 inward to cause the necking rollers 34 attached thereto to move in and contact the end of the bulb 67. When the sliding sleeve 31 is drawn back by the necking lever shaft 27, the necking levers 22 are drawn outward to move the necking rollers away from the end of the bulb 67, by the necking slide spring 33a on which tension was placed by the inward movement of the necking slide 33. The face of the necking guide plate 20 is cut out to provide for the projection therethrough of the necking rollers 34 and the necking plug 29. The necking plug 29 is a detachable plug fitted on the forward end of the necking plug shaft 30 to cooperate with the necking rollers 34 in the formation of the neck on the bulb 67. By making this plug easily detachable from the shaft 30, plugs of various sizes may be used to insure proper neck formations when tubing of different diameters are to be necked.

As in Figure 13 the motor reducer chain 123 connects the motor sprocket 113, on the motor 122, to the reducer drive sprocket 114 on the drive shaft 109. This drive shaft 109 drives the water jacket drive shaft 11 through the burner drive sprocket 116 on the drive shaft 109, the reducer burner chain 125, and the burner driven sprocket 117. The operating cam wheel 52 through its cam sprocket 107, is driven by the drive reducer 121. The reducer driven sprocket 115 conveys this motion to the cam sprocket 107 through the reducer cam chain 124.

When the operating cam wheel 52 moves around so that the necking cam 126 located on the side thereof strikes the necking cam roller 43, the cam roller lever 38 will cause the cam lever shaft 26 to turn. This takes place because the cam roller lever 38 connects the necking cam roller 43 to the cam lever shaft 26. The cam lever shaft 26 is supported by the cam lever bracket 16. The turning of the cam lever shaft 26 in a counterclockwise direction will cause the necking arm 39 attached to the top thereof to also turn in a counterclockwise manner. This counterclockwise movement of the necking arm 39 will cause the necking lever clevises 45 and 45', to which it is connected, to also move in the same direction.

There are two necking rods, 50 and 51, which are connected respectively to necking lever clevises 45 and 45' through the necking lever pins 46. The short necking rod 51 is connected to the nearer necking lever shaft 27 through the necking rod lever 49. Thus the counterclockwise movement of the necking lever clevis 45' will be transmitted into the counterclockwise movement of the necking lever shaft 27 which is connected to the necking device located in the water jacket 1 adjacent the operating cam 52. The counterclockwise movement of the necking lever shaft 27 will cause the necking rollers 34 to move in to form the neck on the bulb to be necked.

The necking mechanism on the water jacket 1' is also actuated by this counterclockwise movement of the necking lever clevis 45. The necking arm rod clamp 48 is clamped on the rod 50 so that when the rod 50 moves to the right, transmitting the counterclockwise movement from the necking lever clevis 45, it will push ahead of it the necking arm swivel block 47. This swivel block 47 is loosely fitted about the long necking rod 50. The necking arm plate 40 is pivoted to the swivel block 47. Thus the pushing to the right of the swivel block 47 by the necking arm rod clamp 48 will result in the clockwise movement of the necking arm plate 40 which connects the swivel block 47 with the necking lever shaft 27. Thus, due to the manner in which this connection between the long necking rod 50 and the necking lever shaft 27 is made, the counterclockwise movement of the necking lever clevis 45 is transmitted into the clockwise movement of the necking arm plate 40 and its necking lever shaft 27. In this manner, the necking devices in both water jackets are operated through the same mechanism.

When the necking cam 126 has moved past the necking cam roller 43 the springs 120 and 120', on which a tension has been placed by the transmitted counterclockwise motion of the necking lever clevises 45 and 45', will exert a pressure on the necking rod lever 49 and the necking arm plate 40 to draw the necking rods 50 and 51 back to their original position.

It should be noted that the necking cam roller 43 is never actually in contact with the operating cam wheel 52. Its only cam contact occurs when it is contacted by the necking cam 126 which is located on the rim of the wheel 52 as the wheel rotates. Although in Figure 13, the cam roller 43 appears to be touching the wheel 52, in reality it is not. The reason for this apparent contact is the fact that this is a top view. The side views of the wheel in Figures 2 and 5 show an annular side wall recess within which roller 43 may lie without touching the wheel. The reason for this is to prevent unnecessary contact and to obviate any possibility of the necking actuating mechanism being thrown out of line by the constant in and out movement of the water jackets 1 and 1' to which this mechanism is connected.

When the water jacket operating slide 77 causes the water jackets 1 and 1' to move out to permit the indexing of the conveyor wheels, the mechanism, which actuates the necking devices, moves with the water jackets because the necking shaft supports 15 are attached to the sleeves 81 located in the lower extremity of the water jackets. Nevertheless this movement in and out does not disturb the necking actuating mechanism because of the fact that the necking arm swivel block 47 is loosely fitted about the long necking rod 50. Thus when the water jackets move out, the necking arm swivel block 47 slides along the long necking rod 50. When the water jackets move in again, the necking actuating mechanism is automatically returned to its proper original position through the action of the springs 120 and 120'.

What I claim is:

1. In apparatus for forming the ends of glass envelopes; a conveyor mounted for indexing movement through a series of stations and having means for holding a glass envelope thereon; a pair of supporting units mounted, with said conveyor therebetween, for simultaneous and corresponding movement toward and away from said conveyor and each other; a plurality of burners and a forming assembly on each of said units, said forming assembly including operating means movable in addition to the movement of the supporting units; power supplying means; a master cam wheel driven from said power supplying means; three different cam surfaces on said master cam; and an indexing mechanism between one of said cam surfaces and said conveyor, a movement control means between another of said cam surfaces and said supporting units, and a movement control means between the other cam surface and said forming assembly operating means.

2. The combination of claim 1 in which said envelope holding means comprises a recess in said conveyor; a holding lever pivoted to said conveyor and having a portion adjacent the mouth of said recess; and resilient means secured to both said lever and said conveyor whereby said lever is provided with a tendency to move said portion toward the bottom of said recess.

3. The combination of claim 1 and a centering unit mounted on one of said supporting units as a supplement to said indexing means for bringing said conveyor into correct position at each of said index stations.

4. The combination of claim 1 in which said indexing means comprises a ratchet and pawl assembly having a resilient safety arrangement.

5. The combination of claim 1 in which each of said burners comprises an assembly of a plurality of individual plates in the form of ring-like laminations.

6. The combination of claim 1 in which each of said burners is provided with a surrounding circulating water jacket and is ring shaped with burner holes formed about its inner periphery to provide a ring-like flame surrounding said envelope and in substantially right-angled relation therewith.

7. The combination of claim 1 in which said forming assembly comprises a unit having a central shaft; an inner former member mounted on one end of said shaft; a plurality of outer former members mounted for movement toward and away from said inner former; a plurality of levers pivoted in said unit; a cam sleeve, as said operating means, movable on said shaft to engage said levers; and means, operatively joining said levers and said outer formers, whereby the engagement of said levers with said cam sleeve results in the movement of said outer former members.

WILLIAM P. STUCKERT.
HAROLD H. SNYDER.